(12) United States Patent
Utz

(10) Patent No.: US 7,670,067 B2
(45) Date of Patent: Mar. 2, 2010

(54) COMPACT CAMERA MODULE WITH STATIONARY ACTUATOR FOR ZOOM MODULES WITH MOVABLE SHUTTER AND APERTURE MECHANISM

(75) Inventor: Hubert Utz, Alling (DE)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 464 days.

(21) Appl. No.: 11/605,179

(22) Filed: Nov. 28, 2006

(65) Prior Publication Data

US 2008/0075453 A1 Mar. 27, 2008

(30) Foreign Application Priority Data

Sep. 25, 2006 (EP) .................................. 06368013

(51) Int. Cl.
*G03B 9/08* (2006.01)
(52) U.S. Cl. ..................................................... 396/452
(58) Field of Classification Search .................. 396/452
See application file for complete search history.

(56) References Cited

U.S. PATENT DOCUMENTS

| 3,667,210 | A | | 6/1972 | Meitinger |
| 4,322,159 | A | * | 3/1982 | Takahashi et al. ............. 355/57 |
| 4,504,132 | A | | 3/1985 | Martin et al. |
| 4,563,604 | A | | 1/1986 | Xuan |
| 5,206,983 | A | | 5/1993 | Guckel et al. |
| 5,287,140 | A | * | 2/1994 | Kohno ......................... 396/244 |
| 5,349,574 | A | | 9/1994 | Edwin et al. |
| 5,685,062 | A | | 11/1997 | McCarthy et al. |
| 5,838,080 | A | | 11/1998 | Couderchon et al. |
| 5,893,651 | A | | 4/1999 | Sakamoto |
| 5,918,078 | A | | 6/1999 | Imura et al. |
| 5,978,602 | A | | 11/1999 | Toyofuku et al. |
| 6,130,993 | A | * | 10/2000 | Hayakawa ...................... 396/55 |
| 6,285,154 | B1 | * | 9/2001 | Yasuda et al. ............... 318/685 |
| 6,301,441 | B1 | | 10/2001 | Kato |
| 6,339,306 | B1 | * | 1/2002 | Hara ........................... 318/696 |
| 6,339,682 | B1 | * | 1/2002 | Suzuki et al. .................. 396/87 |

(Continued)

FOREIGN PATENT DOCUMENTS

EP    06 368 013.6    2/2007

(Continued)

OTHER PUBLICATIONS

Stan et al., Low-Power CMOS Clock Drivers, TAU'95.*

(Continued)

*Primary Examiner*—W. B. Perkey
*Assistant Examiner*—Dennis Hancock
(74) *Attorney, Agent, or Firm*—Saile Ackerman LLC; Stephen B. Ackerman

(57) ABSTRACT

A shutter and aperture device of a miniature digital camera module is coupled to a moveable lens group and is controlled by a horological type stepper motor from a fixed position from outside the moveable lens group. The coupling element between the stepper motor and the shutter device is a mechanical drive apparatus that allows movement of the shutter device along an optical axis before, during and after adjustment of the shutter setting by the stepper motor. The stepper motor is driven with CMOS I/O allowing integration of all control circuitry, image processing circuitry and a pixel photo imager array into a system-on-chip integrated circuit chip.

17 Claims, 5 Drawing Sheets

U.S. PATENT DOCUMENTS

| | | | |
|---|---|---|---|
| 6,407,774 B1* | 6/2002 | Mabuchi et al. | 348/335 |
| 6,430,368 B1 | 8/2002 | Hata | |
| 6,614,998 B1 | 9/2003 | Senba et al. | |
| 7,016,122 B2* | 3/2006 | Okawara | 359/696 |
| 7,203,011 B2* | 4/2007 | Ito et al. | 359/811 |
| 7,274,805 B2* | 9/2007 | Horie et al. | 382/118 |
| 7,374,353 B2* | 5/2008 | Masuda | 396/460 |
| 2004/0212723 A1* | 10/2004 | Lin | 348/362 |
| 2006/0062559 A1 | 3/2006 | Naka et al. | |
| 2006/0176389 A1* | 8/2006 | Kaneda | 348/335 |
| 2007/0041103 A1* | 2/2007 | Huang | 359/699 |

FOREIGN PATENT DOCUMENTS

| | | |
|---|---|---|
| JP | 09274127 | 10/1997 |
| JP | 2000 098444 | 4/2000 |

OTHER PUBLICATIONS

Co-pending U.S. Patent App. DI-06-005, Filed Sep. 26, 2006, U.S. Appl. No. 11/527,296, "Compact Camera Modules With Lavet Stepping-Motors As Actuators", assigned to the same assignees.

"Micromotor Based on Film Permanet Magnets", by P. Menaround et al., Actuator 2004, 9th Int'l Conf. on New Actuators, Jun. 14-16, 2004, Bremen, Germany, pp. 491-494.

Patent of France No. 823,395, "Perfectionnemants aux Systèmes et appareils de commande électrique à distance, notamment aux moteurs et horloges synchrones," Demandé le 28 Septembre 1936, Délivré le 18 Octobre 1937—Publić le 19 janvier 1938.

"Electric Motor" [Online] Anonymous, Feb. 20, 2007, XP002421017 Wikipedia, URL:http://en.wikipidedia.org/wiki/Electric_motor#AC_motros>.

"Shaded-pole Synchronous Motor" [Online] Anonymous, Aug. 7, 2006, XP002421018, Wikipedia, URL:http://en.wikipedia.org/wiki/Shaded-pole_Synchronous_motor>.

* cited by examiner

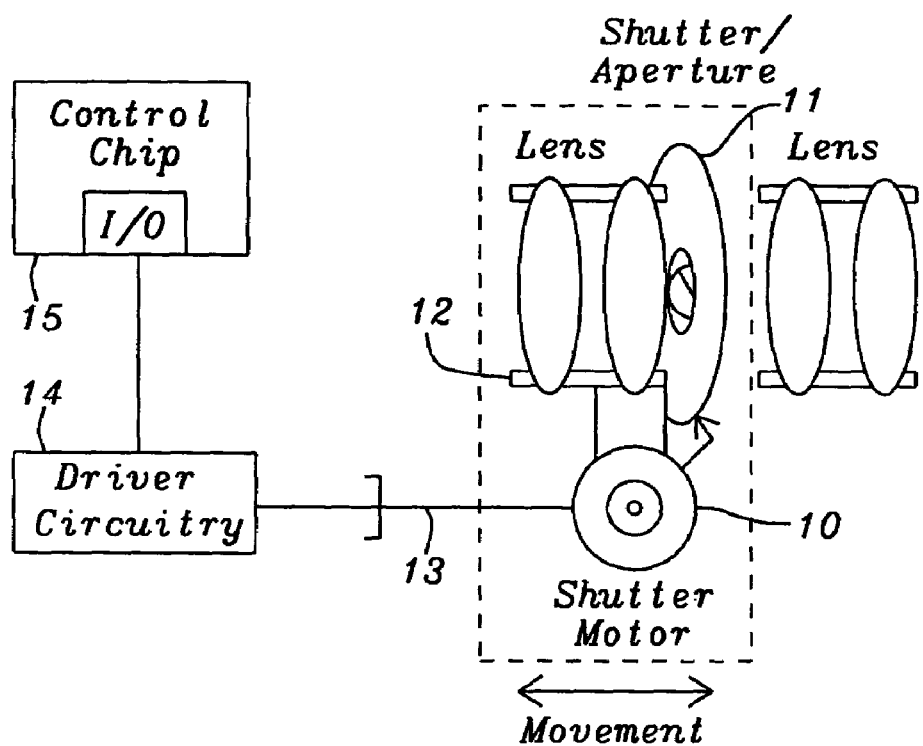
FIG. 1 — Prior Art
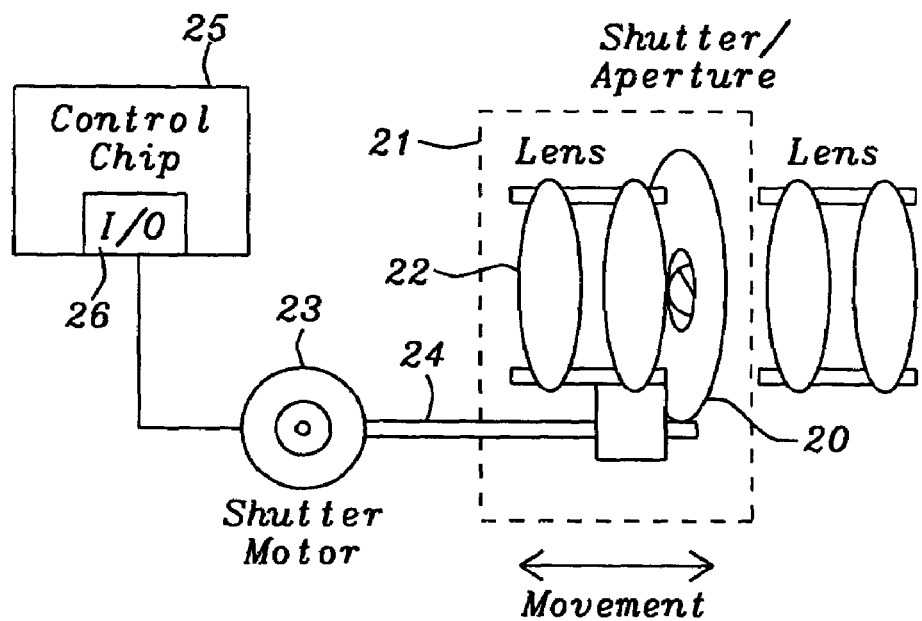
FIG. 2

COMPACT CAMERA MODULE WITH STATIONARY ACTUATOR FOR ZOOM MODULES WITH MOVABLE SHUTTER AND APERTURE MECHANISM

This application is related to U.S. patent application Ser. No. 11/527,296, filed on Sep. 26, 2006, and assigned to the same assignee as the present invention, and which is herein incorporated by reference in its entirety.

BACKGROUND OF THE INVENTION

1. Field of Invention

The present invention relates to digital camera modules used in digital equipment and mobile phones, and in particular to actuators for shutter and aperture control to allow miniaturized zoom modules.

2. Description of Related Art

Today there are various types of actuators used to perform shutter and aperture functions. In traditional digital still cameras where there is a focal-plane implementation with moving shutter/aperture actuators, the actuators are mounted onto the lens group where the mechanics of the shutter is mounted. The electrical connection to the shutter/aperture actuators requires design solutions, which allow the electrical connections to withstand a series of movements during camera lifetime. Most commonly a flex-cable solution is used.

In addition to problems with accommodating the electrical connection, the size of the mechanical integration is growing to achieve a stable movement, which is not a problem in traditional digital still cameras as there is enough space available. However, in miniature digital camera applications, e.g. mobile phones and portable digital assistants (PDA), space is a premium. Not only must there be space allocation for a lens group, but also for a shutter motor and the electrical cable to power the shutter motor. Also motors used in present day digital cameras require considerable power, which puts a drain on the battery of miniature devices, and requires power drivers that are not easily integrated into the camera control chip.

In FR 823395 (Lavet) a low energy stepper motor is directed to horological devices such as watches and clocks. U.S. Pat. No. 5,206,983 (Guckel et al.) is directed to a micromechanical device formed on a substrate using X-ray lithography process to form a rotating micro motor which is driven magnetically.

In FIG. 1 of prior art a shutter actuator motor 10 is mechanically coupled to a shutter/iris located on the optical axis of a lens group 12. The shutter actuator is physically attached to the lens group, which requires a flexible electrical connection such as a flex cable 13 to connect electrical signals to the actuator. Over the life of the digital camera module the flex cable must withstand numerous movements of the lens group, which not only requires the flex cable to have physical properties to withstand the numerous movements but also to allow physical space to accommodate the flexing of the flex cable. Electrical signals are connected to the flex cable 13 by motor driver circuits 14, which are supplied commands from a control chip 15. The motor driver circuits cannot be easily integrated into the control chip because of the amount of current and the associated power needed to be supplied to the shutter motor of the prior art.

In the watch industry precision, compact and low power actuators have been implemented using a Lavet motor concept. The Lavet type motors are capable of driving watch mechanisms with very low voltages and consuming very low current. This is a result of the Lavet style motors being active only when a step is performed, which leads to a very low power consumption resulting in battery life up to five years. Applying the Lavet concept to actuators in motorized camera modules produces lower power consumption along with a smaller size and simple electronic control, wherein the actuator power consumption is approximately fifteen times lower with approximately ten times lower current consumption at a one and a half times lower voltage. This leads to operating product containing digital cameras longer than product using conventional actuator and is particularly important to the mobile phone market.

SUMMARY OF THE INVENTION

It is an objective of the present invention to reduce the overall size of a camera module, which integrates a focal-plane shutter and aperture without a moving electrical connection.

It is also an objective of the present invention to use a horological three-phase motor concept to control the shutter and aperture device of a digital camera function, thereby minimizing the power drain on batteries.

It is further an objective of the present invention to drive the actuator of the shutter and aperture device with integrated CMOS I/O drivers allowing the integration of all electronic picture capture functions onto a single semiconductor chip including the necessary pixel array.

In the present invention an actuator motor for a shutter and aperture device of a miniature digital camera is located in a stationary position, and the resulting actuation of the shutter and aperture device, which is moveable along an optical axis, is accomplished through mechanical coupling. The mechanical coupling provides actuation of the shutter and aperture without restricting the movement of the shutter and aperture device along the optical axis of a lens group to which the shutter and aperture device is physically attached. This allows the required mechanical space for the actuator while permitting the shutter and aperture mechanics to be driven with the actuator motor and allowing the overall system to be miniaturized. The shutter and aperture are placed in the focal plane with a shutter drive shaft coupling the shutter and aperture device to the actuator motor.

The actuator motor of the present invention is a three-phase motor using the Lavet horological motor concept with a predefined number of positions to allow various aperture positions and the overall shutter functionality. The actuator motor is designed to produce a minimum shutter speed in the order of approximately one thousandth of a second. Overall current consumption is reduced by using stable positions within the three-phase horological type actuator motor where no current is required to maintain selected aperture positions thereby increasing battery life.

The three-phase horological motor of the present invention is used to reduce power consumption by the shutter actuator for digital camera functions that form a part of electronic devices comprising portable digital assistant (PDA) and mobile phones as well as digital still cameras (DSC) and camcorders (CC). The current necessary to drive an actuator formed from the three-phase motor allows the actuator to be driven directly with integrated CMOS drivers, thereby allowing an integration of all picture capture functions, including the pixel array, into a single chip forming a system on chip (SOC) implementation.

In the actuator of the present invention a current physical position of the rotor of the three-phase horological type motor is held in position by a static torque, which allows the system to be handled and turned without loosing position of the actuator even when power is turned off. In other motor concepts without static torque either power must be maintained or a frictional force is required to keep track of the position of the actuator.

The actuator of the present invention moves in predefined steps creating changes in position of the actuator that are on the order of approximately six degrees for each step. The small steps allow the motor to operate against a mechanical barrier in order to calibrate the position of the motor. The mechanical construction of the actuator allows placing the actuator into miniaturized camera modules to support requirements of a mobile phone and other electronic devices that contain a digital camera function. The actuator for shutter/aperture is stationary and can be located in a camera module at a convenient location, e.g. a backside of the digital camera module where the required space is available. Also the supply voltage for the shutter/aperture actuator is between approximately 2V and 3.3V.

BRIEF DESCRIPTION OF THE DRAWINGS

This invention will be described with reference to the accompanying drawings, wherein:

FIG. 1 is a schematic diagram of shutter and aperture control of prior art;

FIG. 2 is a schematic diagram of shutter and aperture control of the present invention;

DETAILED DESCRIPTION OF THE PREFERRED EMBODIMENT

Figure 3:
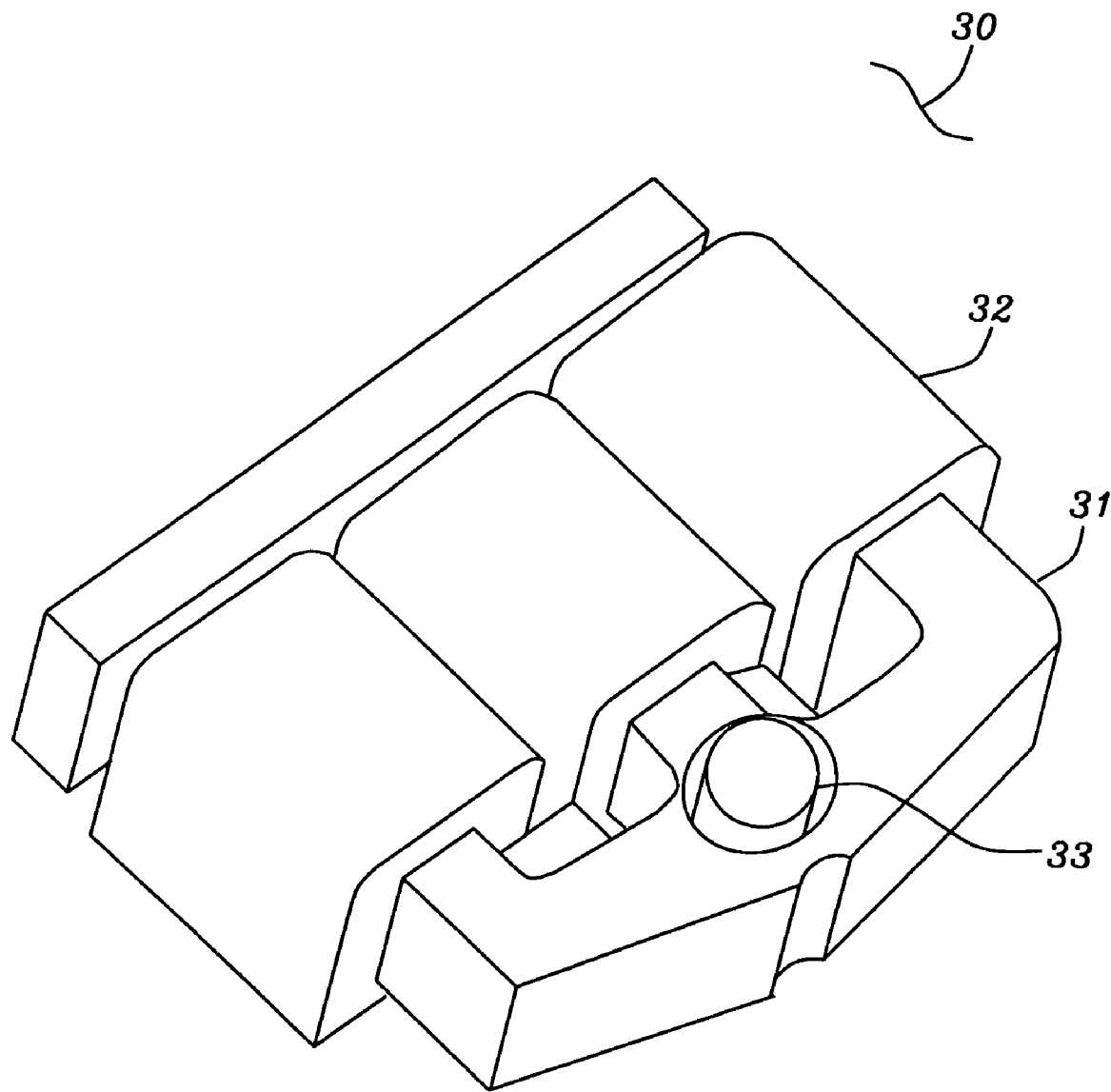
FIG. 3 is a diagram of the three-phase horological motor of the present invention.

FIG. 2 is a schematic diagram of shutter and aperture control of the present invention. A shutter and aperture device 20 is contained within and coupled to a moveable lens group 21 that moves along an optical axis of a digital camera module in which the moveable lens group contains at least one lens element 22. A stationary shutter motor 23 controls the actuation of the shutter and aperture device 20 with a drive apparatus 24, which permits movement of the shutter and aperture device along the optical axis before, during and after the adjustment of the shutter and aperture device 20 by the shutter motor 23. The shutter motor 23 controls the shutter at a high speed in the order magnitude of approximately a thousandth of a second.

The shutter motor 23 is a horological type stepper motor that consumes power only when the stepper motor is being stepped from one rotational position to a next rotational position and uses three phases to control the rotational position of the shutter and aperture device 20. The shutter motor rotates in small steps in the order of magnitude of six degrees allowing the shutter motor to be calibrated against physical stops and is driven by CMOS I/O drivers 26 located on an integrated circuit chip 25 comprising control circuitry. The integration of the CMOS I/O drivers and the control circuitry with image processing circuitry and a photo imager array allows a system-on-chip configuration to be used in a digital camera module, which in turn reduces space and power consumed by the electronics to control and capture digital images.

It should be noted that it is within the scope of the present invention to drive the shutter motor 23 with non-CMOS I/O drivers where the non-CMOS I/O drivers may or may not be integrated with the control circuitry and may or may not form a part of the system on chip configuration.

FIG. 3 is a diagram of the three-phase horological type stepper motor 30 of the present invention. A core 31 of the stepper motor 30 supports three coils 32, which form the three phases of the stepper motor. Contained within the core is the rotor 33 of the motor. The rotor 33 is stepped in small rotational increments in the order of magnitude of approximately six degrees, which allow the motor actuation of shutter and aperture to be calibrated against physical stops. The rotor position is held with static torque when no electrical signal is applied to the coils 32.

Figure 4:
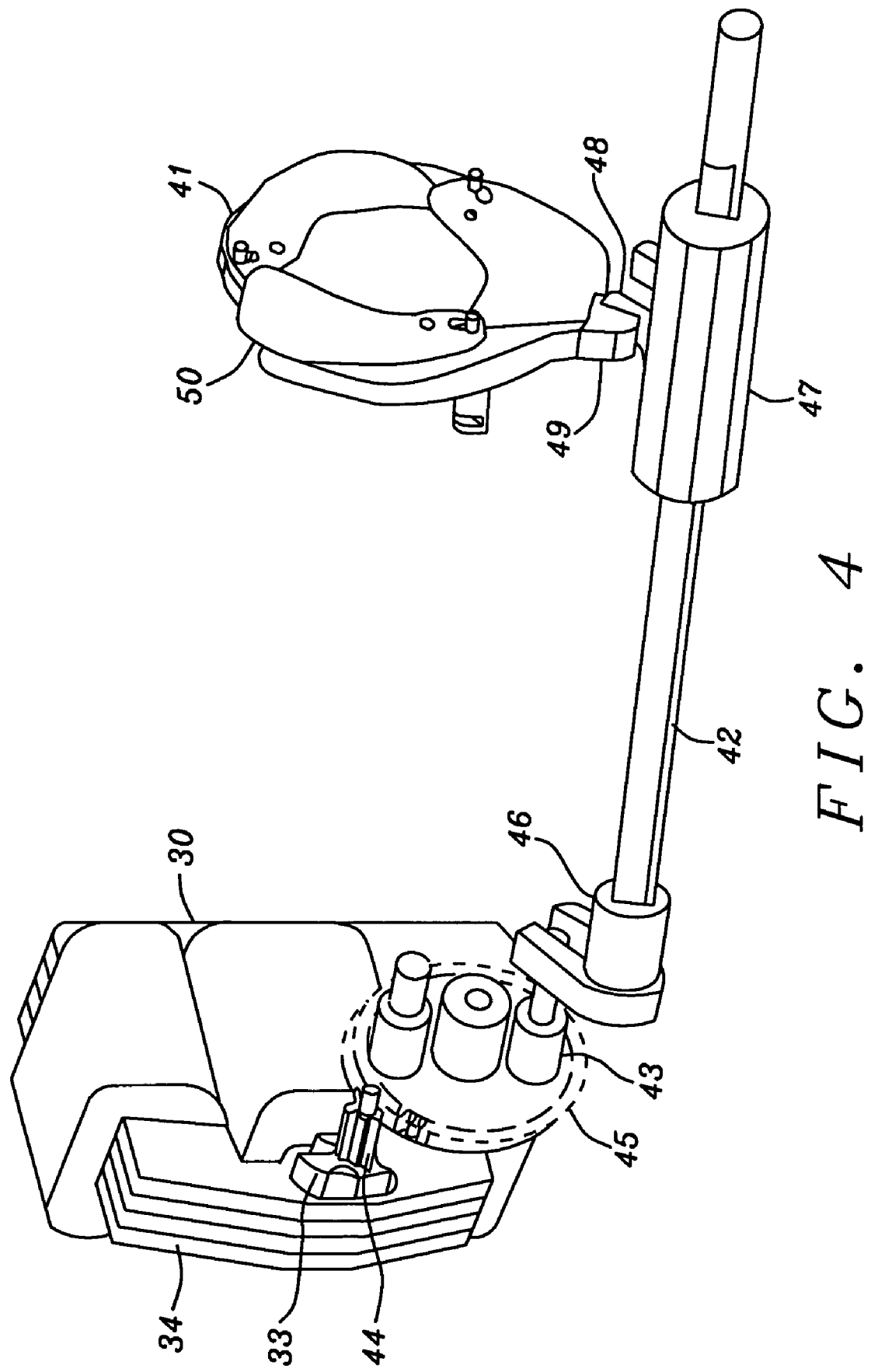
FIG. 4 is a diagram of the three-phase horological motor coupled to a shutter and aperture device of the present invention.

FIG. 4 is a diagram of the three-phase horological stepper motor 30 coupled to a shutter and aperture device 41 of the present invention. The rotor 33 is shown extending beyond the core 34 of the stepper motor whereupon a gear 44 of the rotor engages a driver gear 45, which engages a drive apparatus 42 using an axel gear 43 located on the surface of the drive gear 45. The drive apparatus 42 is shown in FIG. 4, for example, as a shutter rod comprising of a drive shaft 42, a slotted cap 46 and a slider 47. As the rotor gear 44 turns the drive gear 45, the axel gear 43 engages the slotted cap 46, which rotates the drive shaft 42 and the slider 47. A tab 48 on the slider 47 engages a tab 49 on the shutter and aperture device 41 to open and close the shutter blades 50. The slider 47 is free to move along a portion of the drive shaft 42 to maintain position with respect to the location of the shutter and aperture device 41 as the lens group 21 (FIG. 2) is move to adjust an image onto a photo imager device (not shown) that is positioned along the optical axis of the lens group 21.

It should be noted that any equivalent variation of coupling between the stationary actuator motor 30 and the moving shutter and aperture device, including the driving of the drive shaft 42 directly from the stepper motor 30 without the use of gears 44 and 45, is within the scope of the present invention when the coupling between the stationary stepper motor 30 and the moving shutter and aperture device 41 accomplishes the same or similar functional operations.

Figure 5:
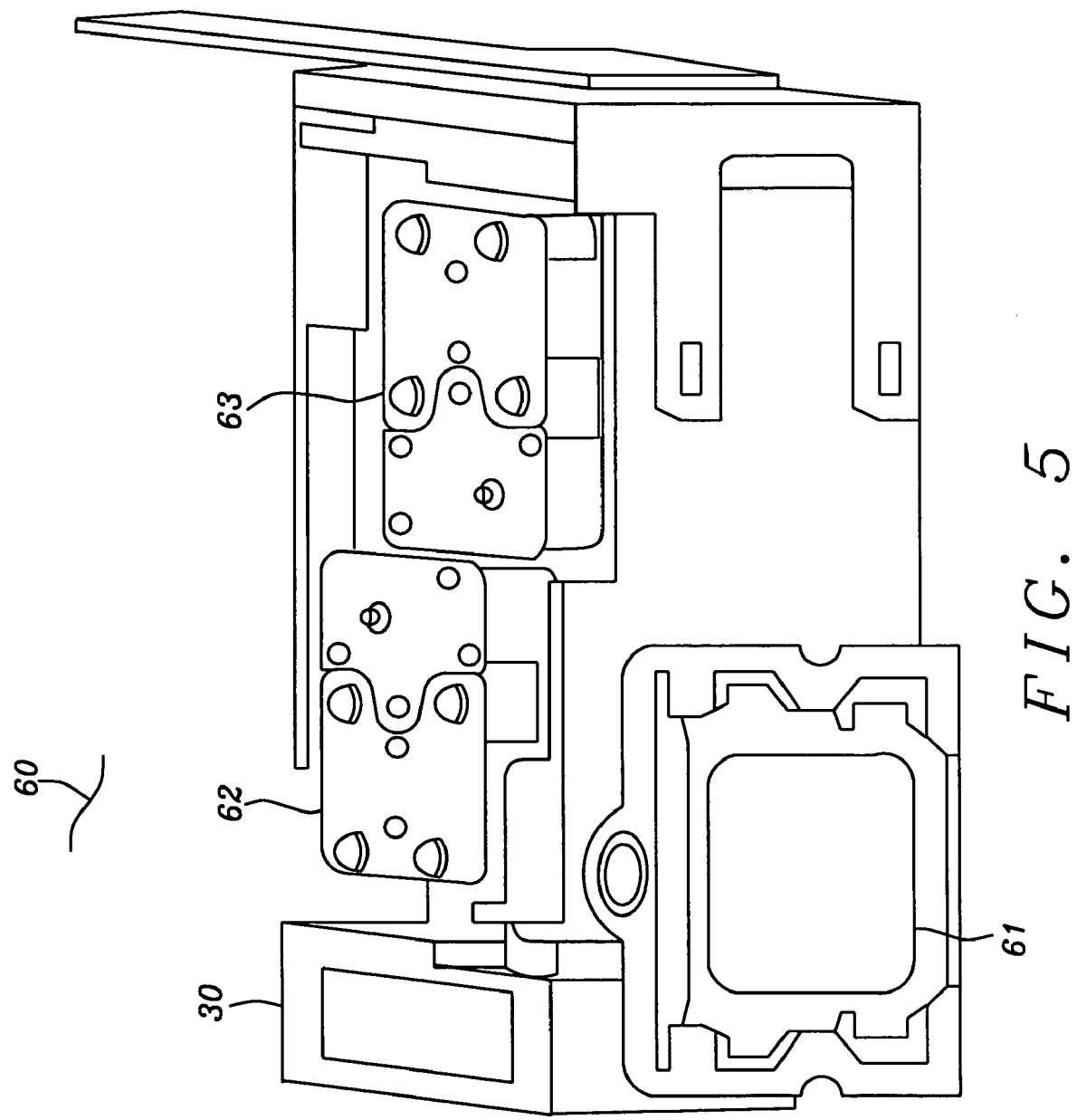
FIG. 5 is a diagram of a compact digital camera module of the present invention.

In FIG. 5 is shown a diagram of a compact digital camera module 60 of the present invention. In this example is shown a first lens 61, which provides light entrance into the optical system of the compact digital camera. The stationary shutter motor 30 of the present invention is located at one end of the digital camera module and is not contained within a moving lens group. Actuator motors 62 and 63 are positioned in the digital camera module 60 to adjust the zoom and focus lens groups the optics system. The coupling between the stationary stepper motor and the moving shutter and aperture device of the present invention facilitates movement an actuator motor of the lens group containing the shutter and aperture device. The compactness of the of the digital camera module shown in FIG. 5 would be difficult to attain without removing the shutter motor from the moving lens group containing the shutter and aperture.

Figure 6:
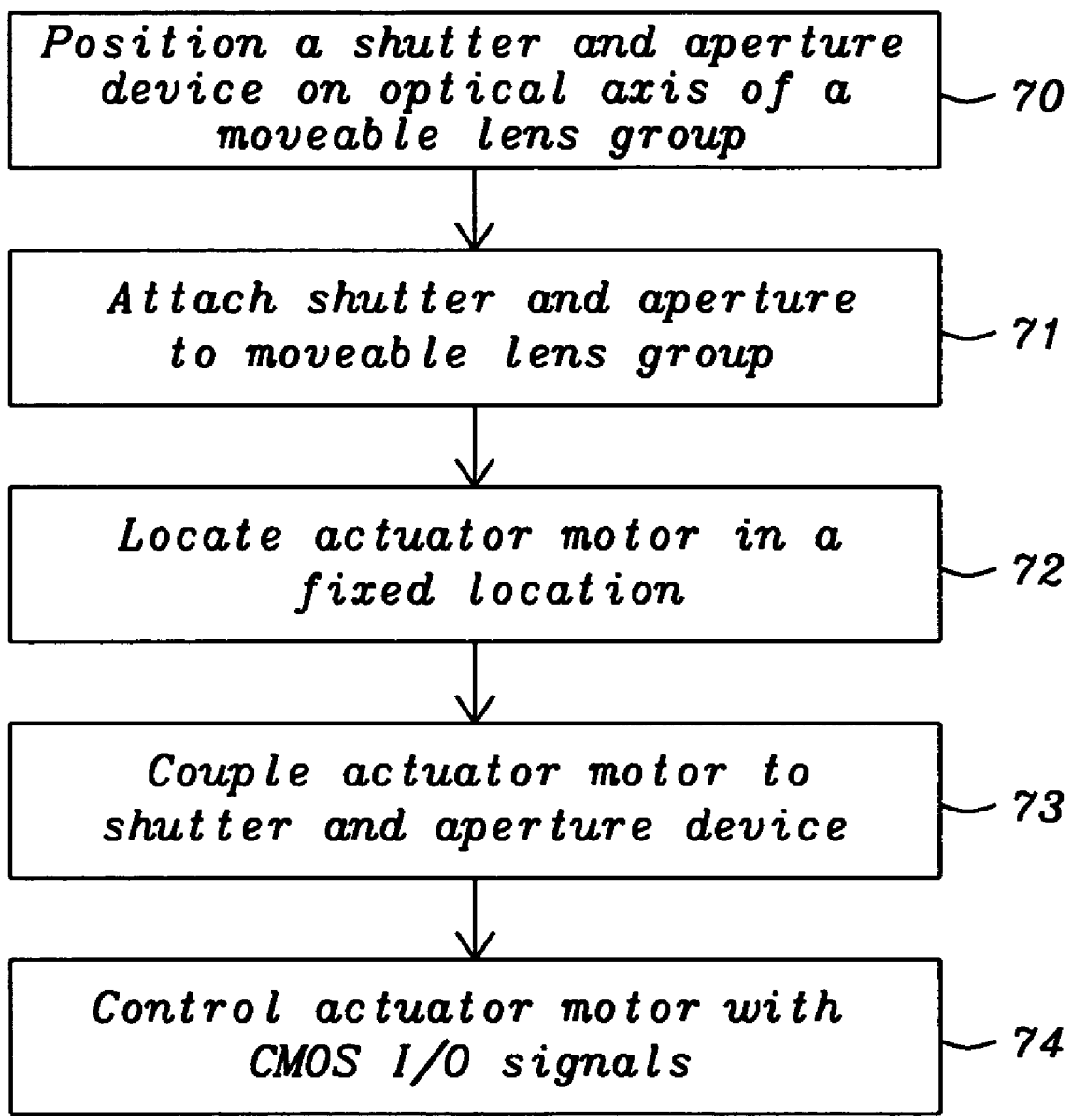
FIG. 6 is a method of the present invention for forming shutter and aperture control in a digital camera module.

In FIG. 6 is shown a method of the present invention for forming shutter and aperture control in a digital camera module. A shutter and aperture device is position on an optical axis of a lens group within a compact digital camera module 70, and the shutter and aperture device is attached to the lens group 71, in which the lens group moves along the optical axis to adjust a image onto photo imager array. An actuator motor comprising a horological type stepper motor is located in a fixed position within the digital camera module 72 and outside of the boundaries of the moveable lens group. The actuator motor is coupled to the shutter and aperture device 73 with a coupling apparatus that allows the actuator to adjust the shutter and aperture device while allowing the shutter and aperture device to move with the lens group along the optical axis. The actuator motor is controlled with CMOS I/O signals 74, eliminating the need for motor driver devices, allowing an integration of the CMOS I/O with control circuitry, imaging processing circuitry and an imager pixel array to form a system-on-chip and reducing power dissipation and complexity of the digital camera module.

While the invention has been particularly shown and described with reference to preferred embodiments thereof, it will be understood by those skilled in the art that various changes in form and details may be made without departing from the spirit and scope of the invention.

What is claimed is:

1. A digital camera shutter apparatus, comprising:
   a) a shutter and aperture device;
   b) an actuator stepper motor;
   c) a drive shaft;
   d) a CMOS I/O driver;
   e) said shutter and aperture device positioned on an optical axis of a moveable lens group and mechanically attached to said moveable lens group;
   e) said actuator stepper motor located in a fixed location external to said moveable lens group and mechanically coupled to said shutter and aperture device by said drive shaft, wherein the drive shaft further comprises:
      i) a slotted cap to receive rotation from the actuator stepper motor;
      ii) a slider that engages the shutter and aperture device to impart said rotation to the shutter and aperture device; and
   f) said CMOS I/O driver integrated onto an integrated circuit chip comprising control circuitry and providing control signals to said actuator motor.

2. The apparatus of claim 1, wherein said actuator stepper motor is a three phase horological type motor.

3. The apparatus of claim 2, wherein said actuator stepper motor uses static torque to hold a rotor position of said actuator motor when electrical signals from said CMOS I/O driver are not applied.

4. The apparatus of claim 1, wherein said actuator stepper motor uses gears to translate rotation of a rotor of the actuator motor into a force to control said shutter and aperture device.

5. The apparatus of claim 1, wherein said rotor of the actuator stepper motor directly drives said shutter and aperture device.

6. The apparatus of claim 1, wherein said actuator stepper motor controls operation of said shutter and aperture device with a drive apparatus coupled to the actuator motor, whereby said shutter and aperture device is free to move along the optical axis while being actuated by said actuator stepper motor.

7. The apparatus of claim 1, wherein said integrated circuit chip further comprises a pixel array of a photo imager and image processing circuitry to form a system-on-chip.

8. A method for controlling a shutter and aperture device, comprising:
   a) positioning a shutter and aperture device on an optical axis of a lens group in a digital camera module;
   b) attaching said shutter and aperture device to said lens group, wherein said lens group moves along said optical axis to adjust images projected onto a photo imager;
   c) locating an actuator stepper motor in a fixed location within said digital camera module;
   d) coupling said actuator stepper motor to said shutter and aperture device, wherein said coupling is drive shaft, which further comprises a slotted cap for receiving rotation from the actuator stepper motor and a slider for engaging the shutter and aperture device moving along the optical axis, and for imparting said rotation to the shutter and aperture device; and
   e) controlling the actuator stepper motor with CMOS I/O signals from an integrated circuit chip to actuate said shutter and aperture device, wherein said actuator stepper motor consumes power only when the stepper motor is stepped from one rotational position to a next rotational position.

9. The method of claim 8, wherein said actuator stepper motor is a horological type stepper motor and consumes no power when not performing said rotating step.

10. The method of claim 9, wherein said actuator stepper motor is held in position by static force in the absence of the CMOS I/O signals.

11. The method of claim 8, wherein coupling said actuator stepper motor to the shutter and aperture device uses said drive shaft, whereby the shutter and aperture device is free to move along the optical axis.

12. The method of claim 11, wherein said actuator stepper motor comprises gears for driving said drive shaft.

13. The method of claim 8, wherein said CMOS I/O signals emanate from an semiconductor chip comprising control circuitry, image processing circuitry and a photo imager array to form a system-on-chip.

14. A shutter and aperture apparatus, comprising:
   a) a means for performing shutter and aperture function;
   b) a means for controlling said shutter and aperture function from a stationary stepper motor mechanically coupled to a shutter and aperture device while the shutter and aperture device is free to move along an optical axis;
   c) a means for controlling said stationary stepper motor from an integrated circuit chip using CMOS I/O circuits;
   d) said means for performing shutter and aperture function comprises the shutter and aperture device coupled to a moveable lens group; and
   e) said means for controlling the shutter and aperture function from the stationary stepper motor controls the shutter and aperture device with a coupling apparatus, whereby said coupling apparatus allows the shutter and aperture device to move along the optical axis before, during and after the shutter and aperture device is adjusted by the stationary stepper motor, wherein the coupling apparatus comprises a drive shaft and a slider that engages the shutter and aperture device to impart rotation to the shutter and aperture device as the shutter and aperture device moves along the optical axis.

15. The apparatus of claim 14, wherein said coupling apparatus comprises gears to engage the drive shaft, which further comprises the slider that engages the shutter and aperture device to impart rotation to the shutter and aperture device.

16. The apparatus of claim 14, wherein said means for controlling the stationary stepper motor is from an integrated circuit chip using CMOS I/O circuits connected to said stationary stepper motor.

17. The apparatus of claim 16, wherein said integrated circuit chip is a system-on-chip that further comprises control circuitry, image processing circuitry and a photo imager array.

* * * * *